United States Patent
Allen

(10) Patent No.: US 7,254,009 B2
(45) Date of Patent: Aug. 7, 2007

(54) ENCLOSED ELECTRICAL SWITCHGEAR AND METHOD OF MANUFACTURE

(75) Inventor: Bruce D. Allen, Stamford, CT (US)

(73) Assignee: Lex Products Corp., Stamford, CT (US)

( * ) Notice: Subject to any disclaimer, the term of this patent is extended or adjusted under 35 U.S.C. 154(b) by 0 days.

(21) Appl. No.: 11/546,174

(22) Filed: Oct. 10, 2006

(65) Prior Publication Data

US 2007/0053142 A1     Mar. 8, 2007

Related U.S. Application Data

(63) Continuation of application No. 10/703,943, filed on Nov. 7, 2003, now Pat. No. 7,136,278.

(60) Provisional application No. 60/445,087, filed on Feb. 4, 2003.

(51) Int. Cl.
*H02B 1/04* (2006.01)
*H02B 1/20* (2006.01)

(52) U.S. Cl. .................... 361/647; 361/641; 361/643; 361/648

(58) Field of Classification Search ............... None
See application file for complete search history.

(56) References Cited

U.S. PATENT DOCUMENTS

| 5,627,724 | A  | * | 5/1997  | Leach et al.      | 361/663 |
| 5,663,862 | A  | * | 9/1997  | Hopping-Mills     | 361/115 |
| 6,002,580 | A  | * | 12/1999 | LeVantine et al.  | 361/634 |
| 6,160,700 | A  | * | 12/2000 | Wise et al.       | 361/643 |
| 6,424,520 | B1 | * | 7/2002  | Cornell et al.    | 361/648 |
| 6,459,570 | B1 | * | 10/2002 | Buchanan          | 361/648 |

\* cited by examiner

*Primary Examiner*—Boris Chervinsky
(74) *Attorney, Agent, or Firm*—Knobbe Martens Olson & Bear, LLP

(57) ABSTRACT

A company switch-type of electrical switchgear is disclosed having improved safety characteristics and having a reduced profile. The electrical connections are typically all enclosed in one area facing one direction such that access to the connections can be controlled and interlocked with one or more main breakers. By enclosing the connections in one area and directing the leads out of the enclosure in one direction, the size of the enclosure can be reduced while the safety of its use is increased.

37 Claims, 8 Drawing Sheets

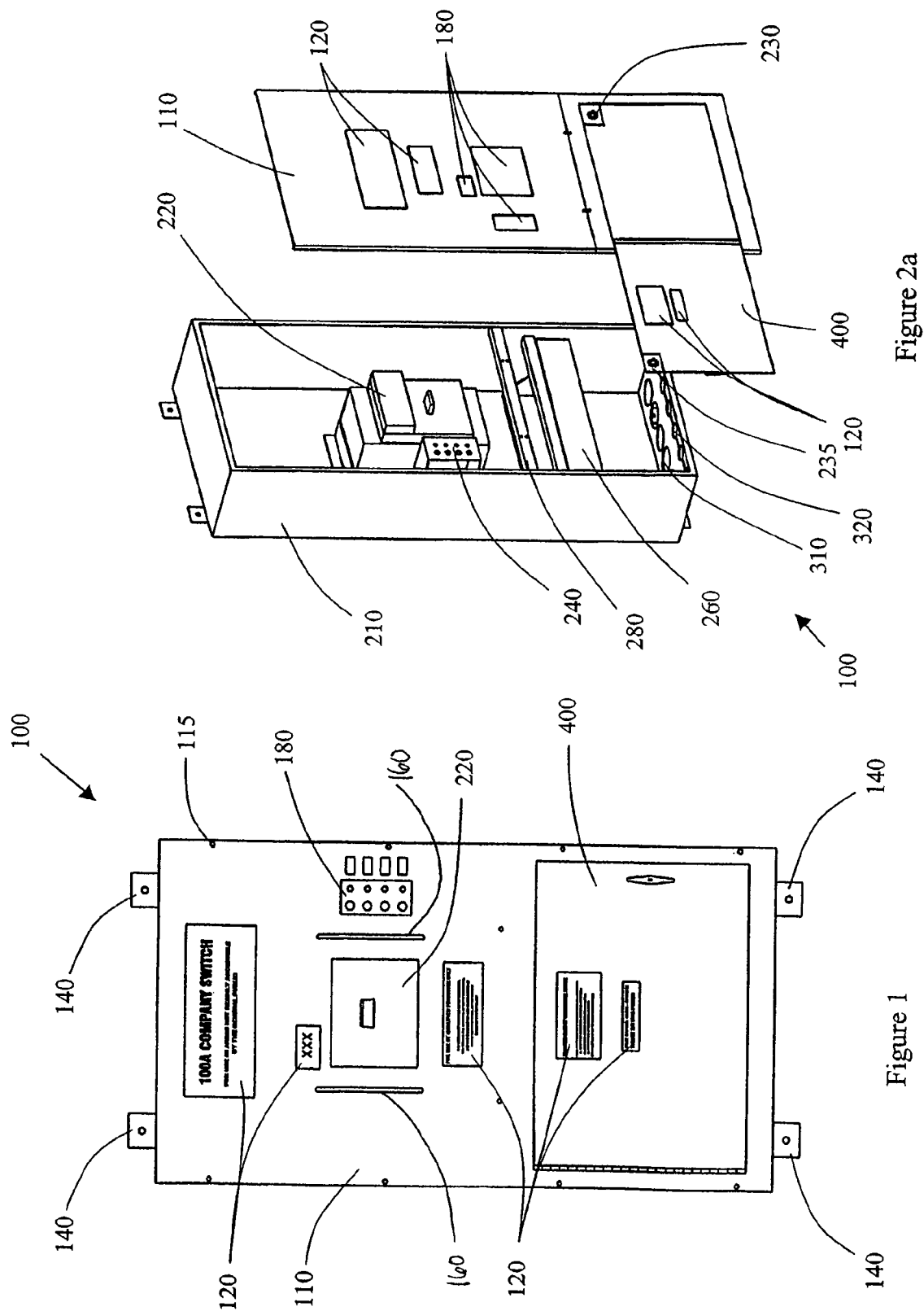

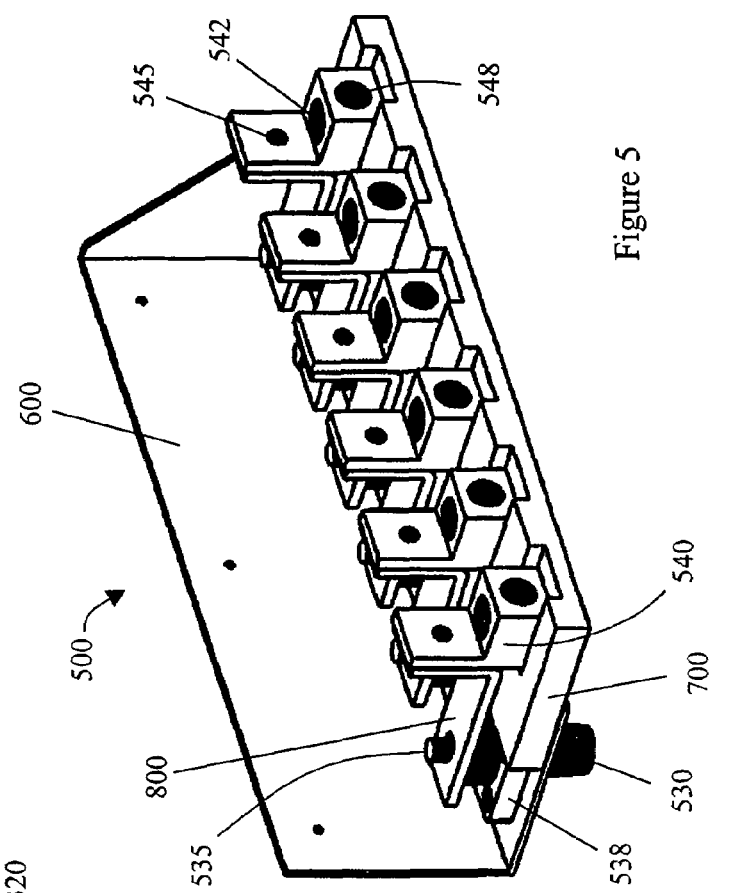
Figure 5
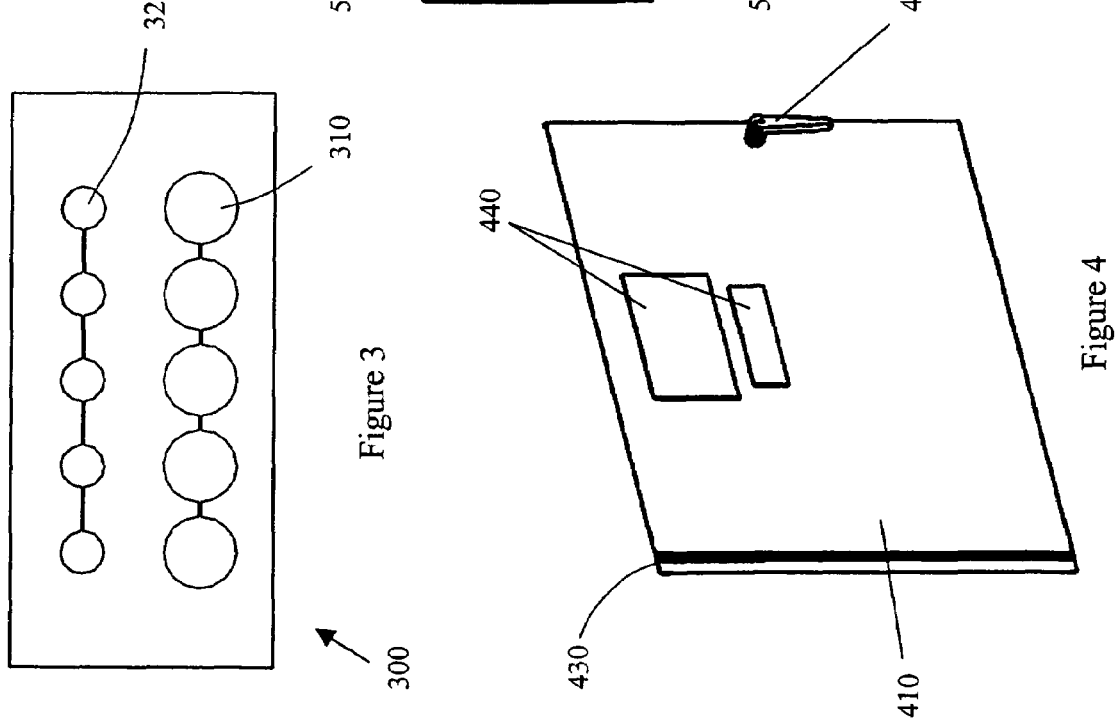
Figure 3
Figure 4

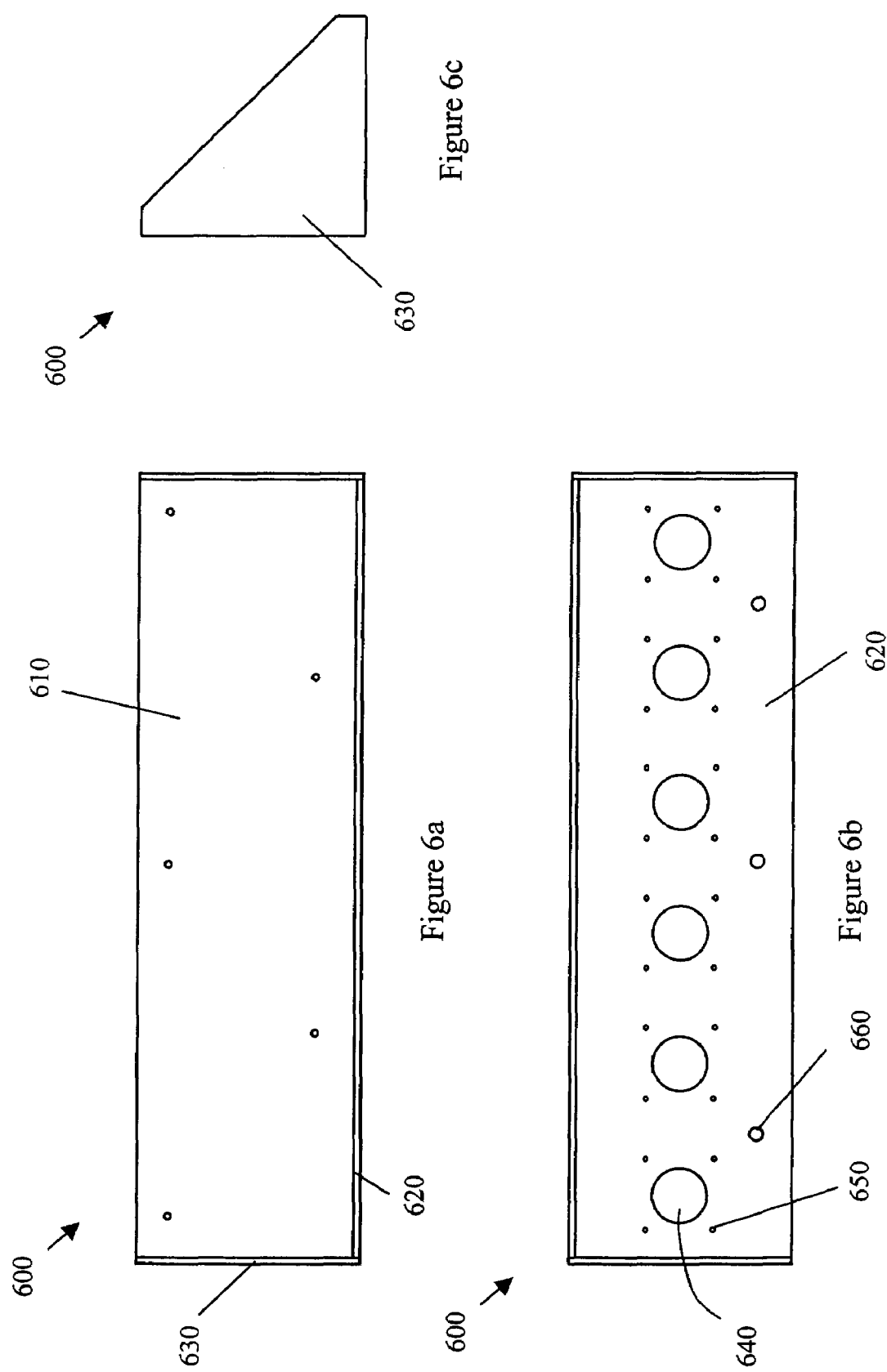

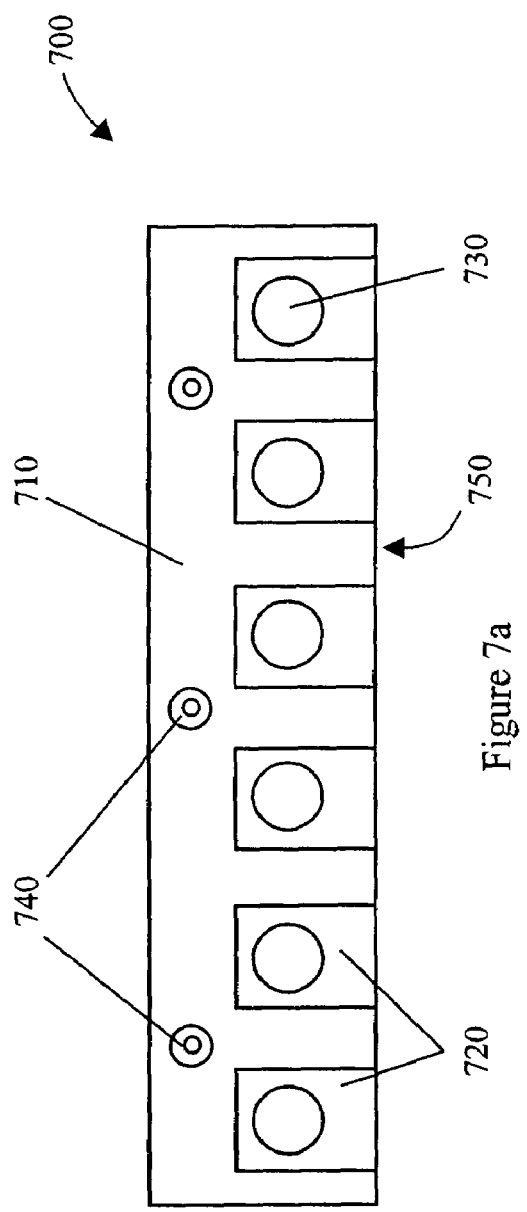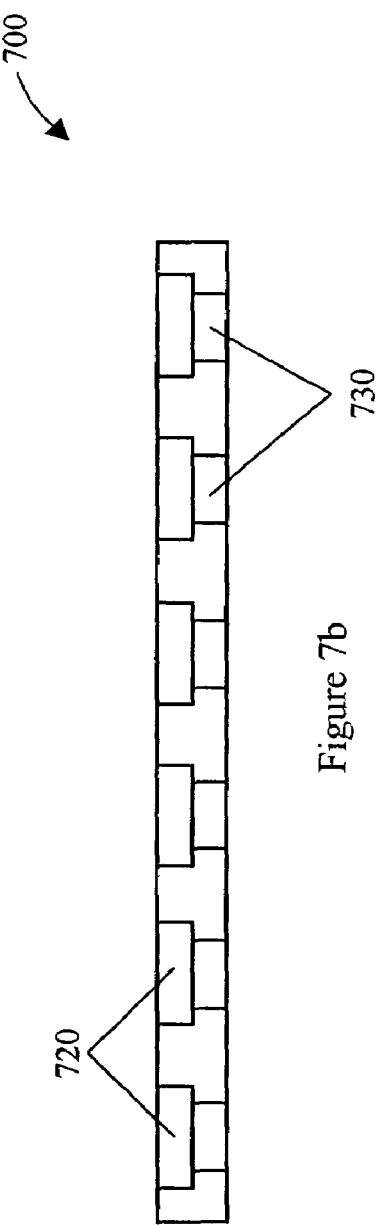
Figure 7a
Figure 7b

ENCLOSED ELECTRICAL SWITCHGEAR AND METHOD OF MANUFACTURE

RELATED APPLICATIONS

This application is a continuation of U.S. application patent Ser. No. 10/703,943, filed Nov. 7, 2003, now U.S. Pat. No. 7,136,278, which claims priority under 35 U.S.C. § 119(e) to U.S. Provisional Patent Application Ser. No. 60/445,087 (filed Feb. 4, 2003), all of which are hereby expressly incorporated by reference in their entireties.

BACKGROUND OF THE INVENTION

1. Field of the Invention

This invention relates to the field of electrical power distribution switchgear. More particularly, this invention relates to temporary electrical power distribution switchgear.

2. Description of the Related Art

A particular type of electrical switchgear known as a "company switch" is commonly used in the entertainment industry to provide consistent temporary power facilities in the backstage areas of theatres, concert stages, and other entertainment venues. A Company Switch is typically a metal box containing a circuit breaker and five or six "single pole" power connections for bare wire as well as prefabricated connectors. Previously, company switches were made by putting together mismatched parts to provide an area and enclosure for distributing power supplied by a main line to various connections. These were often fabricated on the spot and served their purpose but were not particularly safe or well designed.

Recently, manufacturers have begun making such distribution switchgear in enclosures designed for their application. Additionally, these manufacturers have also added the feature of more than one connection type from each distribution line in the enclosure. One particular manufacturer utilizes a lug connection and a cam-type connector in parallel with each distribution lead from the main line. This allows one to make a connection with the box by either a bare lead, or by a pre-fabricated cam-type connector.

One company switch currently used for local distribution of power provides two different types of termination; however, they are not both enclosed in a protective enclosure. As is common with company switches, either one or both sets of the connections are surface mounted on the enclosure. Therefore, it is possible to touch an energized contact causing severe shock. Some company switches also utilize a lug connection cover panel for covering the bare wire lug connections. This cover panel is interlocked with the main breaker. The interlock acts to de-energize the connections when the cover panel is opened. But, because the cover panel only covers the lug connections, the cam-type set of connectors is always exposed and there is always a significant risk of electrical shock.

Furthermore, one or both sets of terminations face forward out of the enclosure and away from the mounting surface such that when a connection is made, the lead extends straight out from the connection and perpendicular from the mounting surface. The leads extending straight out from the front of the enclosure and perpendicular from the mounting surface results in a high profile from the wall or mounting surface. This results in the connections taking up valuable space and increases the likelihood of accidents caused by these leads extending out from the company switch in this manner.

Such distribution boxes have not been designed for optimal safety and size reduction. In many instances, the area in which the distribution box is used is of a relatively small size, or alternatively several distribution boxes may be needed in the same location. In such applications, a distribution switchgear box with a reduced enclosure size would be beneficial. Furthermore, currently manufactured company switches allow access to the connection terminals while the terminals are energized, thereby creating a risk of shock to those who may accidentally touch the exposed terminations while they are energized. Therefore, there exists in the field a need for a safer design that can significantly reduce the risk of shock from touching an exposed and energized termination or connector while reducing the overall size of the company switch and achieving other benefits.

SUMMARY OF THE INVENTION

The devices and methods have several features, no single one of which is solely responsible for its desirable attributes. After considering this discussion, and particularly after reading the section entitled "Detailed Description of the Preferred Embodiments" one will understand how the features of the device and methods provide several advantages over traditional devices and methods.

One embodiment of the invention includes a power distribution system, comprising a housing, at least one electrical input lead, a switch positioned at least partly in the housing and operably connected to said at least one input lead and adapted to control a flow of electrical current through said power distribution system, at least one electrical distribution line electrically connected to said switch, a plurality of terminations located in the housing, each termination adapted to removably and electrically connect an associated distribution line to a removable output lead, wherein said plurality of terminations are divided into two equal sets of first terminations of a first termination type and second terminations of a second termination type and wherein one of said first terminations is electrically connected to each distribution line and is also electrically connected to one of said second terminations, a connection chamber in said housing, said chamber configured to enclose said plurality of terminations and to facilitate an electrical connection of one of said output leads to one of said terminations, and an access panel attached to said housing on one side of said connection chamber and adapted to allow user access through said housing to said connection chamber and said terminations, said access panel being interlocked with said switch such that when said access panel is opened, said switch is open to stop a conduction of electrical power from said input lead to said plurality of terminations, and wherein said plurality of terminations are oriented such that all output leads enter said enclosure from substantially the same direction.

In some embodiments of a power distribution box, the first termination type comprises a prefabricated termination and said second termination type comprises a bare wire connector. In other embodiments, the first and second set of terminations each comprise 6 terminations. In some embodiments, the connection chamber is large enough to reduce the likelihood of a person being able to contact a live terminal. In other embodiments, the interlock is an electrical interlock comprising a control circuit that is open when said access door is open. The interlock can be a mechanical interlock comprising a mechanism that opens said switch when said access panel is not fully closed in some embodiments.

In the power distribution box of some embodiments, the output leads enter the enclosure through at least one hole in a side of the enclosure and the housing further comprises at least one strain relief covering the at least one hole and configured to absorb strain that is applied to the output lead. The strain relief of some embodiments comprises a spring-returned plate adapted to engage an insulating coating of the output lead. A lock is attached to the access panel to prevent unauthorized opening in some embodiments.

In another aspect, a power distribution device is disclosed, that comprises a housing, a switch adapted to control the flow of power out of the power distribution device, a connection chamber in the housing, an access door attached to the housing that allows access to the connection chamber, a plurality of first electrical terminations of a first termination type located in the connection compartment and electrically connected to the switch, a plurality of second terminations of a second termination type located in the connection chamber, wherein each of the second terminations is electrically connected in parallel electrical configuration to one of the first electrical terminations such that the power distribution box is adapted to accept output leads of the first and second termination types, and an interlock attached to the access door and adapted to open the switch whenever the access door is opened.

In yet another aspect, a company switch is disclosed that comprises an enclosure, a first set of terminations located in the enclosure, wherein each of the first set of terminations is adapted to accept an output lead from a first direction, a second set of terminations located in the enclosure, wherein each of the second set of terminations is adapted to accept an output lead from a second direction, and a switch for controlling the flow of electrical power to the first and second sets of terminations, wherein the first and second sets of terminations are enclosed in the enclosure in an orientation such that the first and second directions are substantially parallel.

In still another aspect, an electrical power distribution system is described comprising at least one power supply line, a company switch of any of the previous embodiments, and at least one lead adapted to electrically connect to one of the first or second sets of power supply terminations.

In another aspect, a method of distributing electrical power is described that comprises connecting an input lead to a switch, connecting at least one output line to the switch, electrically connecting each output line to a first termination of a first termination type and to a second termination of a second termination type, and electrically connecting at least one distribution lead to one of the first or second terminations, wherein all distribution leads connected to the first and second terminations are connected in generally parallel directions.

In another aspect, a company switch is disclosed comprising, an enclosure, a switch for controlling the flow of electrical power from a supply line into one or more output leads, and means for electrically connecting each output lead to a first distribution lead of a first distribution lead termination type and a second distribution lead of a second distribution lead of a second termination type, wherein the electrical connecting means is enclosed in the housing in an orientation such that each of the first and second distribution leads enter the enclosure from the same direction.

In a final aspect, a bus bar for use in an electrical switchgear is disclosed comprising a first connector of a first connection type, a second connector of a second connector type, and a conductive bar for connecting the first and second connectors, wherein the conductive bar supports the first and second connectors in an orientation such that connections to the first and second connectors are made from the same direction. In some embodiments of the bus bar, the first connector is integral with the bus bar. In some embodiments, the first connector is a cam-type connector. In yet other embodiments, the bus bar comprises an L-shaped bracket having first and second ends, wherein the first end is connected to the first connector and the second end is connected to the second connector.

BRIEF DESCRIPTION OF THE DRAWINGS

FIG. 1 is a front elevation view of one embodiment of a company switch.

FIG. 2a is an exploded perspective view of the embodiment of a company switch illustrated in FIG. 1.

FIG. 3 is a bottom view of the embodiment of a company switch illustrated in FIG. 1.

FIG. 4 is a perspective view of an access door of the embodiment of a company switch illustrated in FIG. 1.

FIG. 5 is a perspective view of a shelf component subassembly of the embodiment of a company switch illustrated in FIG. 1.

FIG. 6A is a front elevation view of a structural support plate of the embodiment of a company switch illustrated in FIG. 1.

FIG. 6B is a top view of a structural support plate of the embodiment of a company switch illustrated in FIG. 1.

FIG. 6C is a side elevation view of a structural support plate of the embodiment of a company switch illustrated in FIG. 1.

FIG. 7A is a top view of a support block of the embodiment of a company switch illustrated in FIG. 1.

FIG. 7B is a cutaway side view of the support block of FIG. 6A taken along line A-A.

DETAILED DESCRIPTION OF THE INVENTION

Figure 2C:
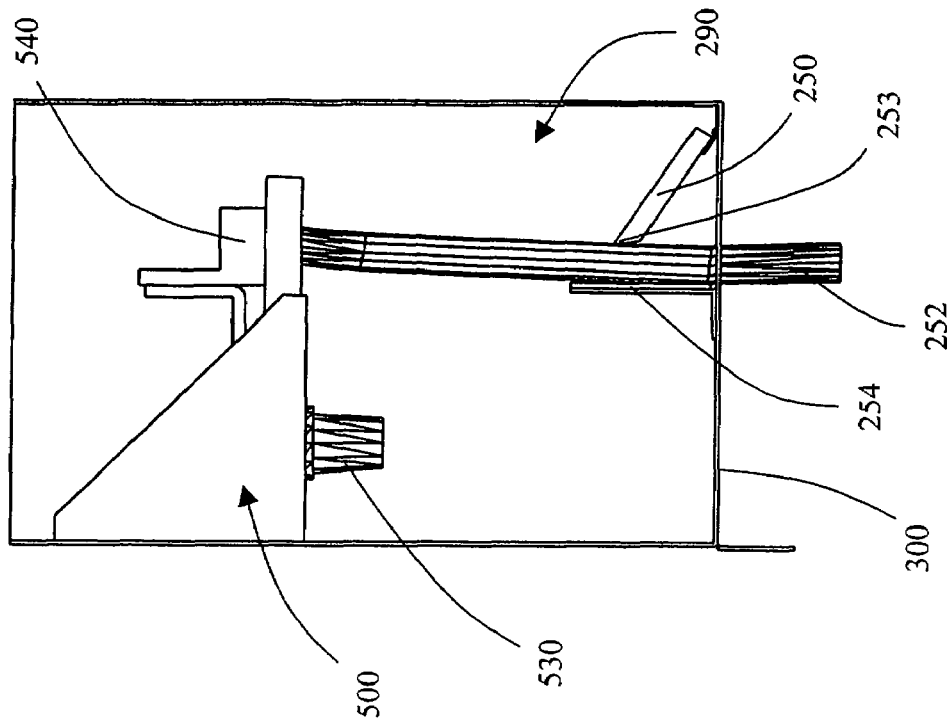
FIG. 2c is a cutaway side view of a portion of the connection chamber of FIG. 1.

Embodiments of the invention will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

FIG. 1 illustrates front elevation view of one embodiment of a company switch 100. As mentioned above, original company switches were made by throwing together a combination of components to take a supply lead and split the lead into a number of distribution lines that were controlled by a master switch. The manufacture of company switches allowed a convenient location for distribution of electrical power for locations that would often be temporary or semi-permanent. Such applications were typically movie sets or live production events such as plays in theaters or musical concerts or other events of this sort. Power consumption in such events has continued to grow as has the demand for higher quality company switches.

The embodiments of company switches described herein can effectively and safely distribute power at various power ratings to numerous output leads while presenting a decreased profile and leading to significant space savings for users. The embodiment of a company switch 100 illustrated in FIG. 1 includes a front panel 110 that attaches to the structural body of the company switch 100 and partially encloses the front portion of the company switch 100. The front panel 110 of the company switch can be integral with the rest of body of the company switch while in other embodiments it is attached by a hinge to an edge of one of the sides of the company switch 100. The front panel 110 can be attached to the structure of the company switch by fasteners 115 as illustrated. The fasteners can be screws, bolts or any other fasteners. Some embodiments will utilize tamper resistant one-way fasteners, which are designed to resist unfastening or other tampering.

In the embodiment illustrated in FIG. 1, several information plates 120 are illustrated. The information labels or plates 120 provide various information regarding the company switch. For instance, some of the plates provide information about the power transmission rating of the company switch 100. Other plates can contain warnings of the risk of shock or other risk or even information about the characteristics of the company switch 100 such as wiring and connection information. Any information can be included on the information plates 120 for any purpose.

The embodiment illustrated in FIG. 1 also includes a number of mounting ears 140. The mounting ears 140 are tabs that are connected to the supporting structure of the company switch 100 and include holes for fastening the company switch 100 to a mounting surface. In the embodiment illustrated, the mounting ears 140 are rectangular tabs that extend from the back of the company switch 100. This embodiment has two such tabs on the top and two on the bottom spaced apart and fitted with holes for utilizing fasteners to mount the company switch 100 to the mounting surface. In some embodiments, the company switch 100 is mounted on a vertical surface such as a wall, however in other embodiments, the company switch 100 is mounted to a horizontal surface such as a floor or a ceiling. The embodiment illustrated in FIG. 1 shows the mounting ears 140 located on the outside of the enclosure formed by the company switch 100, however in alternative embodiments, the mounting ears 140 are contained inside the enclosure of the company switch 100. Such embodiments prevent tampering with the fasteners used to mount the company switch 100. While certain embodiments utilize fasteners such as screws or nails to mount the company switch 100, other embodiments utilize other methods of attaching to the mounting surface such as adhesion, welding or any other method.

In the embodiment illustrated in FIG. 1, a pair of handles 160 is attached to the front of the company switch 100. The handles 160 allow for the manipulation of the front panel 110 of the company switch 100 for mounting the front panel 110 or for other purposes. The handles 160 of many embodiments are raised from the rest of the front panel 110 to aid in preventing the inadvertent opening or closing of the main switch or breaker (described in FIG. 2). This is a particular hazard when the company switch 100 is utilized in close quarters where stage props, hardware or other items may be carried or handled in relatively close proximity to the company switch 100. In such circumstances the front panel 110 may get bumped or otherwise impacted by such objects and the raised handles 160 can act to prevent these objects from operating the main breaker. In the embodiment illustrated, the handles 160 are two generally U-shaped pieces with one located on each side of the main switch and attached to the front panel 110. In other embodiments, the handles 160 are merely flaps of L-shaped material that are attached to the face of the panel 110 to provide the protection previously described. These embodiments are merely examples and any such handles 160 can be used.

The embodiment illustrated in FIG. 1 also includes two access windows 180. The access windows 180 illustrated in this figure are rectangular cutouts in the front panel 110 and allow viewing or access to various components such as a main breaker handle, fuses, indicator lights for the status of the company switch 100 and any other components for which access or viewing may be required. Access to the interior of the company switch 100 can also be accomplished via an access panel 400. The access panel 400 will be described further below, however it can be a locked access to the connection area of the company switch 100 or to other interior components to limit access or prevent inadvertent access to those areas.

FIG. 2 is an exploded perspective view of some of the major components of one embodiment of a company switch 100. The exploded view illustrates the generally rectangular front panel 110 removed from the structural frame or body 210 of the company switch 100. The front panel 110 illustrated is a generally rectangular flat piece that can be made from one unitary piece of material or it can be made of multiple modular pieces that can be interchanged or replaced. In some embodiments, the front panel 110 is made of two separate parts that are both individually attached to the body 210. These two separate parts can be assembled prior to attachment to the body 210 or they can be assembled with fasteners or other connecting elements via framework provided on the body 210. In many embodiments, the front panel 110 will attach to the body 210 via fasteners as described above, however, the sides of the body 210 can also be formed with grooves that the front panel 110 can slide into as well.

The body 210 illustrated is a generally rectangular box having a rectangular back section and four rectangular wall sections, each attached at one elongated edge to a respective edge of the back section in an orthogonal arrangement to form five of the six sides of the rectangular box. The sixth side of the body 210 is the front, which is formed by the front panel, which can be fastened to the body 210 or can be otherwise attached, by adhesion or welding or by sliding into slots that can be formed in the side of the body 210. In most embodiments, the body 210 is made of a rigid material so as to provide the mechanical strength required to safely support the components housed within the body 210 as well as the leads that are connected to the company switch 210. Preferably, the material utilized will be capable of resisting mechanical impacts to the outside surface of the company switch 100, which are not uncommon in many of the settings in which such switches are utilized. Suitable materials can include various metals, polymers, composites, thermosets, thermoplastics or other suitable materials. The body 210 can be formed of one of such materials or a combination of such materials. Certain embodiments utilize materials that are corrosion resistant as well. One embodiment utilizes sheet metal, of an appropriate thickness for the size of the application, including a weather and wear resistant surface treatment such as suitable paints. Certain embodiments utilize a body 210 material that is thick enough to bond interior support members to the sides of the body 210 via fusing, such as welding or other thermal or chemical bonding. Certain embodiments utilize materials for the body 210, front panel 110 and all other structural or support components that are non-conductive or offer very high resistance to conduction or electrical current while other embodiments utilize a surface coating to prevent conduction or further limit conduction.

FIG. 2 also illustrates description labels 120 that can be attached to the front panel or other portion of the company switch 100 for providing information about the company switch 100. The description labels 120 illustrated are generally flat rectangular printed sheets attached to the front panel 110, however any type of label or labeling method can be used. The access panel 400 is illustrated in the open position, which would allow access to the inner portions of the company switch 100 as described below.

FIG. 2 also illustrates the main breaker 220 mounted within the body 210 of the company switch 100. The breaker 220 regulates the flow of electric current from electrical sources supplying electricity to the company switch 100 to the electrical connections the company switch provides, to which output leads that are described below are connected. In certain embodiments, an excess of current through the breaker 220 will cause it to open the circuit and halt the flow of electricity. In many embodiments, the behavior of the breaker 220 is determined by prevailing legal regulations having authority over the use of such switchgear. These may be state, local or even Federal regulations or statutes.

In some embodiments of the company switch 100, the function of the breaker 220 is optionally distributed among several smaller breaker subcomponents. This can be multiple breakers 220, or multiple parts acting together or independently to function in a manner that is functionally equivalent to a circuit breaker. This can include such components as an inlet terminal, an output terminal, a switch, an overcurrent sensing unit, an operating unit to automatically open the circuit during an overcurrent situation, indicating units for indicating the status of the circuit, a manual operator such as a handle to manually open and close the switch and any other such components.

In many embodiments, the breaker 220 further includes a tripping mechanism (not separately identified) for opening the circuit and halting the flow of electricity from a command or control signal provided by remote sensors or control circuits. Such a tripping mechanism can be electrical or mechanical in nature. Where the means is electrical in nature, it can be of the sort referred to as a "shunt trip" or some functional equivalent thereof. The shunt trip can cause the breaker 220 to open the circuit upon the presence of a control signal, or alternatively upon the absence of a control signal. The control signal can consist of one or a combination of phenomena, including but not limited to an electrical voltage or current, or a stream of light or photons or a mechanical force or movement. The electrical or light/photonic signal can be modulated and can also optionally carry a characteristic waveform or a waveform incorporating or encoding data. In addition, the signal can be visible or invisible to the human eye and can be coherent in nature. Additionally, the control signal can be a force applied by a mechanical linkage.

In many embodiments, the breaker 220 is manufactured in quantity and can be one of numerous types including, but not limited to, thermal, magnetic, electronic, or a combination thereof. Certain embodiments utilize Square D® brand electronic trip type molded case circuit breakers from Square D of Palatine, Ill. Square D® breakers that can be used include model numbers LEL36100LI, LEL36200LI and LEL36400LI, although any other such breaker can be used and these are only provided as examples. In some embodiments, the breaker 220 displays, separately or in combination, static or dynamic information about the condition and behavior of the breaker 220 on an information panel (not separately identified) located somewhere on the breaker 220. Where information is static, it can be printed directly on the breaker 220, or it can be printed on a separate label or plate affixed or attached to the breaker 220. Any printing method can be used, such as for example, offset printing, typing, silk screening, computer printing, or handwriting. Where information is dynamic, the information panel can be fashioned of an alphabetic, numeric, or combination of alphabetic and numeric information displays. The displays can use one or a combination of technologies including but not limited to light-emitting-diodes, liquid-crystals, incandescent lamps, neon lamps or displays, electroluminescent indicators, cathode-ray tubes, lasers, or electromechanical displays. The information panel can be incorporated into the breaker 220, or can be located separately from the breaker 220, either inside of the breaker 220 or in a separate enclosure.

It should be noted that although only one breaker 220 is illustrated in FIG. 2, the breaker 220 can control the flow of electrical current to multiple electrical leads, or alternatively, multiple breakers 220 can be used. The multiple breakers 220 of such embodiments can each control the flow of energy to one or multiple leads or poles. In such embodiments, the front panel 110 and other items are adjusted in design to allow access to the control handle for the additional breakers 220 as well as monitoring of the conditions of the breakers 220. In some embodiments, certain leads that connect to the connectors in the company switch 100 are not controlled by a breaker 220. Such leads can be neutral leads that provide the completed circuit and therefore do not requiring circuit breaker protection.

FIG. 2 also illustrates an embodiment including an indicator panel 240, which can be utilized to display various types of information about the breaker or the company switch 100. The indicator panel 240 in one embodiment indicates to installers and users of the company switch 100 the status and condition of the electrical inputs to and outputs from the company switch 100. In certain embodiments, information available from the indicator panel 240 includes one or more of the following: the presence or quantity of electricity through each electrical pole; fault conditions of the electrical inputs or outputs; and fault conditions of any of the components that make up the company switch 100. In other embodiments, the indicator panel 240 also or alternatively contains fuses for the various circuits of the company switch 100. In some embodiments, the fuses protect the breaker 220 control and monitoring functions and associated circuits from an over-current condition. The indicator panel 240 of one embodiment is further illustrated and described below with reference to FIGS. 10A and 10B. In some embodiments, the information display described above for the breaker 220, is located on the indicator panel 240.

The embodiment illustrated in FIG. 2 also includes a connector cover 260. The connector cover 260 provides added protection to connectors that are housed in the company switch 100. The connector cover 260 provides a protective cover over the connectors when they are not being operated, which helps to protect the connectors and their respective operating mechanisms from inadvertent damage that could occur if they were continuously exposed. The connector cover 260 also provides added protection to personnel from contacting an energized connector. As will be described below, several types of connectors that can be used with the company switch 100 are of a lug-type that is characterized by a compression connection between the connector and the lead inserted into the connector. The lead that is accepted by such a connector has an exposed bare wire end that is inserted into an opening in the connector. The opening has a mechanism for applying a compressive and supportive force to the exposed bare wire. The mechanism for providing the compressive force or some portion thereof, or some other portion of the connector is electrically conductive and makes electrically conductive contact with the wire of the lead. If the compressive mechanism is electrically conductive, then the electrical contact is improved by the compressive force of the connector upon the lead. In many connectors of this variety, the compressive force is created by a threaded bolt in the connector. The bolt is turned forcing the bolt inward toward the opening. The bolt can exert the force itself against the lead, or it can force some other component against the lead. Several varieties of this type of a connector utilize a tool for making the connection. These can be of a specialized variety that is specific to a certain connector, or they can be more generally applicable such as a standard screwdriver or wrench.

Still referring to FIG. 2, the connector cover 260 also controls access to the connectors, which can be positioned in alignment immediately behind the connector cover 260. This can provide an additional safety feature in the company switch 100. In many embodiments of the invention, the normal position for the connector cover 260 is in an orientation that increases safety by preventing or limiting access to prevent touching of the connectors by hand or with tools used to adjust connectors. This is a significant design feature for the company switch 100, because connections made to such connectors typically involve bare, non-insulated wire ends that by their non-insulated nature possess an increased risk of electrical shock to a user due to accidental contact with personnel and tools operated by personnel. To allow access to the connectors, the connector cover 260 can swing or hinge to another orientation, but when released, the connector cover 260 automatically swings back to its normal, protective orientation. In certain embodiments, the connector cover 260 can be temporarily locked, through deliberate action on the part of a user, into its non-protective orientation for purposes such as maintenance.

The automatic swinging mechanism for the connector cover 260 can include one or more devices including but not limited to gravity, springs, counterweights, electric motors, magnets, mechanical linkages, or air/hydraulic cylinders. In some embodiments, the connector cover 260 opens with its bottom edge moving upward so as to fall into the protective orientation on its own weight, but can also open downward, to the left, to the right, or in other directions. In some embodiments, individual connector covers 260 are provided for each connector and such connector covers 260 can operate either individually or in any combination.

Still referring to FIG. 2, the connector cover 260 can be fashioned of conductive or nonconductive materials including but not limited to metal, wood, paper, glass, plastic, rubber, resin, cloth, fiberglass, fiber, composites or any combinations thereof. The connector cover 260 is transparent in several embodiments, to permit inspection of the connectors behind it, but it can optionally be semi- or fully opaque in other embodiments.

Embodiments of the company switch 100 can also include one or more struts, structural supports or attachment components. The embodiment illustrated in FIG. 2 includes a structural cross-member 280. The cross-member 280 provides structural support to the body 210 of the company switch 100 and provides an attachment location for attaching the front panel 110. The cross-member 280 can have fastener holes for accepting fasteners that attach the front panel 110 to the body 210. Other structural components are utilized in various embodiments depending on the expected weight loading of the company switch 100 to provide a stable yet lightweight housing for the particular application in which each embodiment is designed to be utilized.

Referring to FIGS. 2 and 3, an embodiment of the bottom wall 300 surface of the company switch 100 is illustrated. The bottom wall 300 illustrated is a generally rectangular shaped side of the body 210 formed by a generally flat and rectangular shaped piece of material. This embodiment incorporates a first row of openings 310 and a second row of openings 320 for the passage of leads into and out of the bottom wall 300 of the company switch 100. As will be described below, certain embodiments of the company switch 100 allow the use of multiple types of lead termination types for connection. For instance, one embodiment allows the use of a bare wire lead end or a cam-type connector that is popular in the electrical power distribution industry. For each pole available for output connection there are two connectors electrically attached to the pole, one is a cam-type and the other is a lug-type or bare wire connector. The two connectors are electrically parallel so that the conduction of current through the pole can be distributed to either of the connectors. This allows each pole in this embodiment to accept either a cam-type terminated lead or a bare-wire ended lead. Such flexibility has been found to be highly desirable among those who utilize such power distribution switchgear.

In several embodiments, the holes 310, 320 will only be as large as necessary to allow the passage of the particular termination attached to the lead that is passing through the bottom wall 300. For example, if a the second holes 320 are designed to allow passage of leads to a connector designed to accept bare-wire leads, then the second holes will be only slightly larger than the size of the cable because no part of the lead is larger than the outside of the insulation of the cable. Alternatively, if the first holes 310 are designed to accept leads that would lead to connectors that accept a type of prefabricated terminal on the lead, then the holes 320 would be only slightly larger than the outer edge of the widest part of the terminal on the lead, assuming the terminal is wider than the cable.

By designing the holes 310, 320 in this manner, the chance of other materials passing into the interior of the company switch 100, which could lead to fouling or damage, is minimized. This also reduces the risk of an electrical shock because the number of items that can be inserted into the interior of the company switch while the connectors are energized is reduced. In certain embodiments, the holes 310, 320 are smaller than many if not all human hands such that a person could not reach into the company switch 100 through the holes 310, 320. Although, the holes 310, 320 in this embodiment are illustrated on the bottom 300 of the company switch 100, this is only an example and other embodiments allow passage of the output lead from one or both sides or the top of the company switch 100. In some embodiments, the holes 310, 320 are not of uniform shape or size as one another allowing for even more variety in the leads that can be accepted. The bottom 300 of different embodiments of the company switch can have various numbers of holes 310, 320, including but not limited to the quantities 1, 2, 3, 4, 5, 6, 7, 8, 9, 10, 11, 12 or more.

Referring to FIGS. 2 and 4, a connection chamber 290 is formed in the interior of the company switch 100 by the bottom 300, the sides of the body 210, the bottoms of the connectors (not shown) and the access panel 400. The size of the connection chamber 290 is mainly determined by the length and width of the body 210 below the connectors. In some embodiments, the connection chamber 290 is sized to allow a connector attached to a lead or cable to reside entirely within the connection chamber 290. In such embodiments, it the ability to tamper with connections that have been made between leads and the connectors inside the company switch 100 is greatly limited. In other embodiments, the length of the body 210 is much shorter, thereby reducing the size of the connection chamber 290 so that only a portion of the connectors at the ends of leads or cables inserted into the connection chamber 290 are housed within the connection chamber 290. Such embodiments of the company switch 100 have a reduced overall size, which can be desirable in various situations. In these embodiments, any portion or all of a connector can extend out of the bottom 300 of the connection chamber 290. The access panel 400, along with the holes 310, 320 in the bottom 300, restricts and controls access to the connection chamber 290, increasing safety by reducing the risk of accidental contact with electrical conductors. In many embodiments, the access panel 400 further increases safety by preventing connection or disconnection while electricity is turned on and/or flowing. An interlock is provided with many such embodiments that prevents the breaker 220 from being closed, or trips open the breaker 220 if closed, if the access panel 400 is not completely closed.

Figure 2B:
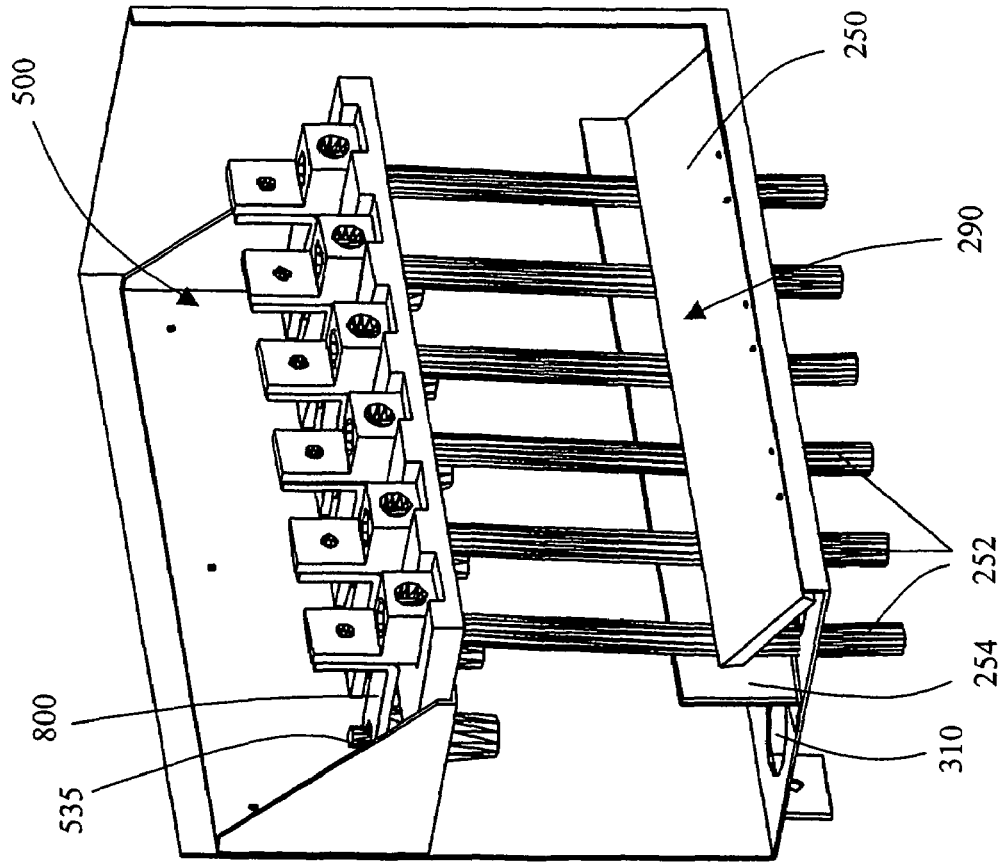
FIG. 2b is a perspective view of a portion of the connection chamber of FIG. 1.
Figure 8C:
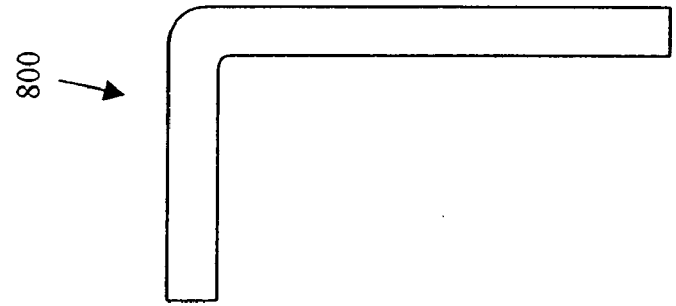
FIG. 8C is a side elevation view of a conducting bar of the embodiment of a company switch illustrated in FIG. 1.
Figure 8A:
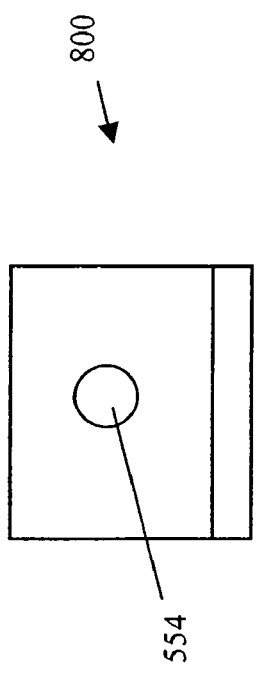
FIG. 8A is a front elevation view of a conducting bar of the embodiment of a company switch illustrated in FIG. 1.
Figure 8B:
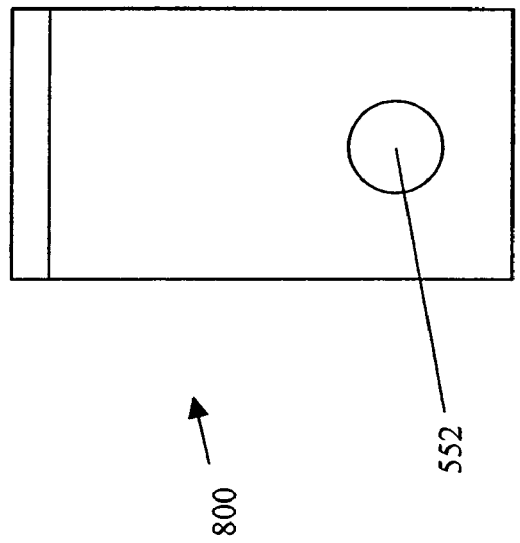
FIG. 8B is a top view of a conducting bar of the embodiment of a company switch illustrated in FIG. 1.

FIGS. 2b and 2c further illustrate the connection chamber 290 of an embodiment of the company switch 100. FIGS. 2b and 2c illustrate a lead capture plate 250 that is included in certain embodiments. The lead capture plate 250 lays flat against the top surface of the bottom wall 300 of the company switch 100. The lead capture plate 250 of this embodiment consists of a flat plate of rigid material hinged in a horizontal axis that is parallel to the intersection of the front panel 110 and the bottom wall 300 of the company switch 100. When no leads/cables/connectors 252 pass through the holes 310, 320, the lead capture plate 250 in its normal position lies flat and partially or fully covers the holes 310, 320, protecting the connection chamber 290 from dust, dirt, and inadvertent contact with electrical conductors by personnel. When the lead capture plate 250 is pulled open from the inside of the company switch 100, the holes 310, 320 are no longer covered, allowing leads/cables/connectors 252 to be passed through the bottom wall 300. When the leads/cables/connectors 252 are inserted through the holes 310, 320, the lead capture plate 250 of several embodiments is biased to return to the rest position against the bottom wall 300, thereby applying a force against the sides of the leads/cables/connectors 252. In the embodiment illustrated, the lead capture plate 250 has a capture edge 253 at the edge near the leads/cables/connectors 252 with a sharp corner to impinge on the insulation of the leads/cables/connectors 252 inserted into the company switch 100. This allows the lead capture plate 250 to provide support to the leads/cables/connectors 252 that are inserted into the connection chamber 290. In some embodiments, the capture edge 253 is rubber to increase the frictional force applied to the insulation without causing damage to the insulation. In other embodiments, the capture edge has a number of sharp shallow ridges that each engage the insulation to increase the supportive force without causing significant damage. Any other method of increasing the frictional force applied to the insulation while minimizing the damage caused can be used. For example, a knurled or ridged edge would provide such functionality.

In addition, a support wall 254 is provided in the embodiment illustrated to assist the lead capture plate 250 in retaining the leads/cables/connectors 252 in the connection chamber 290. The support wall 254 supports the backside of the leads/cables/connectors 252 as the lead capture plate 250 applies a normal force to the surface of the leads/cables/connectors 252, thereby facilitating the friction force and subsequent supportive force created by the lead capture plate 250.

Still referring to FIGS. 2a, 2b and 2c, the lead capture plate 250 can be opened in some embodiments by physically pulling the plate from its normal position from inside of the company switch 100, or by exerting physical force on the lead capture plate from below, in other embodiments. As mentioned previously, in some embodiments a mechanism biases the lead capture plate 250 to resiliently move back toward its normal position. This mechanism can be a spring or other plastically deformable material configured to return the lead capture plate 250 to its at rest position seated against the bottom wall 300. In certain embodiments, an individual lead capture plate 250 is included for each hole 310, 320. Additionally, certain embodiments will include a latching mechanism to lock the lead capture plate(s). In certain embodiments this latching mechanism is operable only from the inside of the company switch 100, thereby limiting the access of the connection chamber 290, limiting the chance of debris or other material from infiltrating the company switch 100, and further reducing the risk of electrocution or electric shock.

The biasing mechanism (not separately illustrated) for the lead capture plate(s) 250 can be constructed to operate using one or more closing mechanisms including but not limited to gravity, springs, counterweights, electric motors, magnets, mechanical linkages, or air or hydraulic cylinders. The lead capture plate 250 and the bottom wall 300 can be fashioned of conductive or nonconductive materials including but not limited to metal, wood, paper, glass, plastic, rubber, resin, cloth, fiberglass, fiber, foam, rubber, composites or any combinations thereof. In some embodiments, one or both of the bottom wall 300 and lead capture plate are made of sheet metal that is coated with a wear resistant and weather resistant treatment such as durable powder coated paint. This surface treatment can advantageously reduce the conductance of electric current as well.

As mentioned above, several embodiments of the invention utilize breakers 220 that include an opening or tripping mechanism for opening the breaker 220 under certain conditions. Such a mechanism, which is internal to the breaker in the embodiment illustrated in FIG. 2, can be connected directly or indirectly to the access panel 400 to determine when the access panel 400 comes off of its fully closed position. For instance, in some embodiments, the access panel 400 has an actuator 235 as described below attached to it that activates a sensor 230 to close an electrical circuit attached to the front panel 110 or other components inside the company switch when the access panel 400 is fully closed. For instance the actuator 235 can be an electrical contact that closes an electrical relay, or sensor 230. The electrical circuit of such embodiments provides a control signal to the breaker 220 to control the condition of the breaker 220. For example, if the circuit is energized, the breaker 220 can be closed; but if the circuit is de-energized, such as if the access panel 400 is not in its fully closed position, the breaker 220 cannot be closed or if already closed will trip open. This is only one example of an interlock that can be used to control the condition of the breaker 220 based upon the open or closed condition of the access panel 400. As described above, in alternate embodiments the access panel can be provided with mechanical linkages that send signals to the breaker 220 in the form of mechanical force or linear or rotational motion. Other embodiments utilize other types of interlock controls for linking the position of the access panel 400 to the breaker 220. For example, these interlocks can include a sensor 230 and an actuator 235. The sensor 230 works in concert with the actuator 235 and the tripping mechanism described above to prevent access to the connection chamber 290 and the connectors when the breaker 220 is closed and the connectors are energized.

In some embodiments, the actuator 235 is positioned on access panel 400 such that when the latter is opened and the actuator is moved a distance from the sensor 230, which is mounted on the body 210 or the front panel 110, that is sufficient to cause the sensor 230 to send a control signal to the tripping mechanism for the breaker 220, thereby opening the main circuit and removing the source of power.

The actuator 235 can act in any manner such as electrical, mechanical, magnetic, photonic, or any combination thereof. The sensor 230 sends a control signal tripping mechanism to open the power distribution circuit upon proper conditions of the actuator 235. The sensor 230 can act in any electrical, mechanical, magnetic or photonic manner, or in any combination thereof. An electrical sensor 230 of some embodiments can be a simple set of contacts, as described above, whose circuit continuity is completed or interrupted by the actuator 235. A mechanical safety sensor of certain embodiments transmits a physical force to the tripping mechanism. A magnetic safety sensor 230 of some embodiments employs an actuator that creates a magnetic field, which would close or open a set of contacts, or induces a current, in the sensor 230. A photonic actuator 235 of some embodiments can employ a physical actuator 235 that alternately blocks or permits light across a photo-electric element in the sensor 230.

The control signal transmitted by the sensor 230 can consist of one or a combination of phenomena, including but not limited to an electrical voltage or current, or a stream of light or photons, or mechanical force or motion. The electrical or light/photonic signal can optionally be modulated and can optionally carry a characteristic waveform or a waveform incorporating or encoding data utilized by data receiving components of certain embodiments of the breaker 220 tripping mechanism that utilize such data. Additionally, the electrical or light/photonic signal can optionally be visible or invisible to the human eye, and can be coherent in nature. In the embodiment illustrated, the sensor 230 and actuator 235 are located on the side of the access panel 400 that is near the handle 420, rather than on the side nearer the hinge 430, however this illustrates just one embodiment and these components can be located anywhere on the access panel 400 and front panel 110 or on other components. The location of the sensor 230 and actuator 235 provide for varying levels of sensitivity to motion of the access panel 400. When these components are farther from the hinge 430, a relatively small amount of rotation of the access panel 400 about the hinge 430 is required to create the separation necessary to trip the breaker 220. In embodiments where the sensor 230 and actuator 235 are close to the hinge, more rotation of the access panel is required to trip the breaker 220. Such considerations are taken into account when deciding on the location of the sensor 230 and actuator 235 and those of skill in the art will recognize that various applications and various tripping mechanisms will utilize various locations in maximizing the performance sought in each embodiment.

Still referring to FIGS. 2 and 4, certain embodiments of the invention include various rubberized pieces for weatherproofing the company switch 100. For instance, certain embodiments utilize sealing material such as neoprene that fits between the contacting surfaces of the body 210 and the periphery of the front panel 110 and between the contacting surfaces of the front panel 110 and the periphery of the access panel 400. This forms a seal when the front panel 110 is attached to the body 210 and when the access panel 400 is closed. These embodiments can also include resilient and transparent material to cover the access holes 180 in the front panel 110 as well. Certain embodiments provide suitably flexible material to cover one or more of the access holes to allow operation of the breaker 220 or other components requiring manipulation. Such embodiments can provide an effective means for limiting water infiltration into the company switch 100, further expanding the scope of applications in which the company switch can be used.

Still referring to FIGS. 2 and 4, an embodiment of an access panel 400 that can be used with the company switch 100 is illustrated. The access panel 400 illustrated includes a panel portion 410, a handle 420, a hinge 430 and one or more information labels 440. In the embodiment illustrated, the access panel 400 is attached to the body 210 by one or more hinges (not shown) along one edge of the access panel 400. The panel portion 410 of the access panel 400 illustrated is a generally flat rigid piece of material utilized to enclose the connection chamber 290 of the company switch 100. Other embodiments utilize bent panel portions, for instance to allow access to the connection chamber 290 from the front as well as from one or both of the sides. The panel portion 410 can also be formed of any suitable shape, and the rectangular shape illustrated is only provided as an example. The panel portion 400 can be made of any rigid material such as sheet metal, polymers, composites or any combinations thereof. Certain embodiments are made of sheet metal of an appropriate thickness to resist significant impact and tampering.

The embodiment illustrated in FIG. 4 also includes a handle 420. The handle 420 illustrated is a generally "L" shaped piece of metal that is attached by fasteners to the panel portion 410 with the short end of the "L" portion extending perpendicularly from the panel portion 410. The handle 420 can extend through a hole in the panel portion 410 so that it can be fastened to the panel portion 410 from the side of the panel that is inside the enclosure when the access panel 400 is closed. The handle 420 of several embodiments includes a mating latch (not shown) that acts in concert with a portion of the body 210 in proximity to the handle 420 to secure the access panel 400 to the body 210 when closed and latched. Some handles 420 include a lock to further limit access to the interior of the company switch 100. The handle 420, the lock and latching mechanism can be any such items known in the art and are utilized or interchanged as desired to best suit each particular application. The hinge 430 can be any type of hinge suitable for allowing the opening and closing of the access panel 400. In most embodiments, the hinge is attached to one of the sides of the rectangular panel portion 410 by fasteners, bonding or adhesion. The hinge 430 is also attached to a portion of the body 210 to which the access panel 400 is to attach. In other embodiments, a hinge 430 is not used and the access panel 400 is otherwise attached to the front panel 110, for instance by sliding the access panel 400 into grooves (not shown) in the front panel 110 or the body 210. In some embodiments, more than one hinge 430 are used and the hinge(s) can be integral to the access panel 400 and the body 210 or front panel 110, or can be attached to these items. The hinge 430 is shown on the left side of the access panel 400, however it can be attached to any side of the access panel 400 and body 210 allowing opening of the company switch 100 from various directions.

Referring to FIGS. 2a, 2b, 2c and 5, an embodiment of a shelf component subassembly 500 is illustrated. The shelf component subassembly 500 provides structural support for back and front connectors 530, 540 that are used in the embodiment illustrated. The shelf component subassembly 500 also positions the connectors in the connection chamber 290 of the company switch 100 as well. The shelf component subassembly 500 includes a support bracket 600 that provides most of the structural support for the connectors 530, 540. The support bracket 600 illustrated generally in FIG. 5 is illustrated in further detail in FIGS. 6A, 6B and 6C, which show the front, top and side views of the support bracket 600, respectively.

In the embodiment illustrated in FIG. 5, the back connectors 530, as will be described below, are inserted through holes in the bottom of the support bracket 600 and are then fastened to the support bracket 600 to secure them in place. The back connectors 530 are generally metallic or otherwise conductive conductors shaped to accept a prefabricated terminal from a lead and provide a means of physically and electrically attaching that lead to a supply lead inside the company switch 100. A back connector 530 of several embodiments is a single pole connector that attaches only one electrical pole, though more than one may be utilized in other embodiments. The back connectors 530 are each a combination of an electrically-conductive assembly 535 partially surrounded by and supported by an electrically-insulating assembly 538. The electrically-insulating assembly 538 provides a means of physically attaching the back connector 530 to the support bracket 600 and provides physical support for the electrically-conductive assembly 535. The back connector 530 of some embodiments can be constructed from a combination of materials including but not limited to metal, plastic, synthetic or natural rubbers, or glass.

The company switch 100 can contain a quantity of one or more back connectors 530 of this description, or another type, including but not limited to the quantities 1, 2, 3, 4, 5, 6, 7, 8, 9, 10, or more. In many embodiments, the back connectors 530 are sized and shaped to attach to nationally or industrially standardized mating connectors. In the embodiment illustrated, the back connectors 530 are a standard single pole cam-type connector while the front connectors 540 are a standard lug-type bare wire connector. These are just examples of the types of connectors 530, 540 that can be used and any types and combinations can be used and varies with the application for which the company switch is built.

The support bracket 600 that is illustrated in FIGS. 2, 5, 6A and 6B consists mainly of a bent piece of rectangular metal having an upper vertical portion 610, a lower horizontal portion 620 and two right-triangular side supports 630. The side supports 630 are attached along each right side to both the vertical portion 610 and the horizontal portion 620, so as to provide added stability and support to the structure of the support bracket 600. In other embodiments, one or both of the side supports 630 are unnecessary due to the construction or materials of the other parts of the support bracket 600. For instance, a rectangular piece of heavy gage sheet metal is first reinforced by stamping one or more raised ribs into its length running parallel to the bend that will later be formed in the sheet. The ribs provide added structural strength to the sheet of metal. The rectangular piece is then bent to form the vertical and horizontal portions 610, 620. Many other such construction techniques common in the art can be utilized to increase the strength of the support bracket 600, which can simplify the construction and reduce the material required.

In addition, the materials utilized to manufacture the support bracket 600 can be varied depending upon the application. Some embodiments utilize a light sheet metal because it is strong, easy to work and relatively inexpensive. Other embodiments utilize heavier gage sheet metal for added strength. The metal can be any type however steel, aluminum and various alloys are common examples that are used in many embodiments. Additional embodiments utilize various plastics and composites to form the support bracket 600 because various plastic product manufacturing techniques can simplify construction of the component and because of the electrically insulative and corrosion resistive properties of these materials. The support bracket 600 can be composed of one or more conductive or non-conductive materials, including but not limited to metal, wood, paper, glass, plastic, rubber, resin, cloth, fiberglass, fiber, composites or any combinations thereof. The support bracket 600 can be fashioned using one or more methods including but not limited to molding, shaping, machining, cutting, sawing, drilling, bending, welding, casting and/or forging. The support bracket is attached to or is part of the body 210 of the company switch 100. The support bracket 600 can be attached by fasteners through holes in the upper portion 610 or it can be adhered, bonded or welded to the body 210.

In the embodiment illustrated in FIGS. 5, 6A, 6B and 6C, various holes 640, 650 and 660 have been formed in the horizontal portion 620 of the support bracket 600. The connector holes 640 are formed in the support bracket 600 to allow the passage of a connector receptacle through the horizontal portion 620. In one embodiment, a prefabricated terminal receptacle or back connector 530 can be mounted to the horizontal portion 620 by passing a receiving portion of a back connector 530 through the connector holes 640 and then attaching the back connector 530 to the horizontal portion 620 with fasteners, which can be inserted through the fastener holes 650 that are formed in the support bracket 600. A set of support block mounting holes 660 is also provided in the horizontal portion 620 of several embodiments. The support block mounting holes 660 provide for fasteners for attaching the support block 700 to the support bracket 600.

Referring to FIGS. 2, 5, 6A, 6B, and 6C, the support bracket 600 also provides a means of physically and structurally supporting the back connectors 530 such that when a matching, mating electrical connector is attached to a back connector 530, its axis of alignment is parallel to the mounting surface of the company switch 100 and is perpendicular to the horizontal portion 620. The support bracket 600 of several embodiments provides physical support to the back connectors 530 such that they can neither rotate around their axes nor move in any direction under forces typical of normal operation and use. In many embodiments, the back connectors 530 extend through the connector holes 640 and have a connection bolt or pole for electrically connecting the back connectors 530 to the leads exiting the breaker 220 or other unswitched leads. The back connectors 530 of these embodiments are attached to the horizontal portion 620 with fasteners and are then connected via their individual poles to the appropriate leads.

The support block 700 of the embodiment illustrated in FIGS. 5, 7A and 7B is a generally flat plate 710 having various shapes 720, 730, 740 formed therein to allow for support of one or more front connectors 540. The support block 700 provides electrically-isolated, physical support for the front connectors 540. The support block 700 may be composed of one or more pieces of conductive or non-conductive materials, including but not limited to metal, wood, paper, glass, plastic, rubber, resin, cloth, fiberglass, fiber, or composite combinations thereof. A set of connector grooves 720 is formed into the support block for supporting and aligning the front connectors 540. The connector grooves 720 can be formed in the support block 700 as one unitary structure, or they can be formed in the support block 700 as a step of a production process. The connector grooves 720 are characteristically shaped to capture and secure the front connectors 540, preventing the front connectors 540 from rotating about the axis of their lead holes 542, from rotating about the axis of their attachment holes 545, and from moving laterally left or right, or moving down. In the embodiments illustrated, the connector grooves 720 are six regularly spaced rectangular cutouts extending downward from the top of the plate 710 to a depth of about half of the thickness of the plate 710. The connector grooves 720 also extend from the forward edge 750 of the plate 710 towards the centerline of the plate 710 to a depth sufficient to fully or partially house the front connector 540 selected to be used with the company switch 100.

In some embodiments, the connector grooves 720 prevent rotation of the front connectors 540 about the two aforementioned axes without the need for pins, screws, or other attachments methods by housing part of the front connectors 540 in the support block 700. The support block 700 is conducive to the replacement of the front connectors 540, which in some embodiments are removed by unengaging mounting fasteners that engage through the attachment holes 545, by sliding the front connectors 540 out along their respective connector grooves 720. The support block 700 provides this securing function by means of its shape in such embodiments, by means of conductive or nonconductive fasteners, or by a combination of one or more of these methods. In several embodiments, the support block 700 electrically insulates each of the front connectors 540.

Referring to FIGS. 2, 5, 7A and 7B, the support block 700 provides a means of passing one or more wires or cables through to front connectors via one or more lead holes 730. The lead holes 730 illustrated are generally regularly spaced circular holes formed through the plate 710. The wire passage formed by the lead holes 542 and the holes 320 in the body 210 can be a hole or orifice of circular, polygonal, or any other shape.

Still referring to FIGS. 2, 5, 7A and 7B, the support block 700 is characteristically shaped so as to allow the front connectors to be located immediately in front of and proximate to a corresponding and electrically parallel back connector 530. The block mounting holes 740 are generally round holes formed in the support block 700 that allow the support block to be fastened to the support bracket 600 via corresponding mounting holes 660 in the support bracket of FIG. 6B. The block mounting holes 740 and the mounting holes 660 in the support bracket are arranged so as to align the lead holes 730 of the support block 700 with the connector holes 640 of the support bracket 600. The front-back relationship of each pair of corresponding front and back connectors 530, 540 of the embodiment illustrated eliminates misidentification of the polarity of a specific front connector, and results in a substantial size reduction when compared to previous embodiments. Furthermore, the connector grooves 720 and lead holes 740 in the support block 700 position the front connector 540 in an orientation such that a cable connected to the front connector 540 exits the front connector 540 along an axis that would be parallel to any cables exiting the back connectors 530. This configuration yields further space savings by creating a lower overall profile of a fully connected company switch 100 and allows a user to utilize both the front connector 540 and its corresponding back connector 530 at the same time. In past switches, this was not possible due to the orientation of the various connectors.

The support block 700 of some embodiments limits the access of users to the front connectors 540 by partially surrounding the front connectors 540 except for the front edge 750. This allows a user to adjust and tighten setscrews in the front connectors 540 with the proper tool, yet prevents or limits physical and electrical contact with other sides or portions of the front connectors 540 from the direction in which the tool is being inserted. For this same reason, in embodiments where a setscrew is utilized, it is even less likely that a tool used will damage the body of the front connector 540 during normal operation, leading to a longer component life and fewer replacements. The shape of the lead holes 542 can consist of but is not limited to a hole or orifice of circular, polygonal, or any other shape.

The support block 700, in some embodiments, provides for physically supporting or assisting in the support of the back connector 530 in the manner described above. The support block 700 can be physically supported by the support bracket 600, through direct connection or bonding, through attachment or affixment to the body 210, or through any combination thereof.

Referring again to FIGS. 2 and 5, the front connectors 540 of some embodiments are standard electrical terminals, as described above. The front connector 540 can be a standard component used in the electrical equipment industry used to provide physical and electrical attachment for the cut end of a wire or cable. In the embodiment illustrated, the front connectors 540 are generally rectangular shaped metal blocks that have a lead hole 542 through which the bare end of a lead is passed, one or more connection holes 545 for supporting the connector and one or more connection holes 548 for engaging the bare end of a lead. The attachment holes 545 are holes in a portion of the front connector 540 providing locations through which a bolt, screw or other fastening device may be passed, which when tightened, attaches the front connector 540 to some support structure;

in the embodiment illustrated, a bus bar 800. The front connector 540 of many embodiments, as illustrated in FIG. 5, typically provides one or more connection holes 548 and corresponding "set screws" which, when tightened, forces the set screw into the lead hole 542 so that it impinges against the lead within the lead holes 542. This impingement holds the lead inside the lead hole 542 thereby providing both physical and electrical attachment for the front connector 540. Electrical terminals are typically made of conducting material including but not limited to metal or semi-conducting material, and are optionally treated with a nonconductive insulator over areas where conductivity is not required. The company switch 100 of some embodiments contains a quantity of one or more electrical terminals fitting this description, including but not limited to the quantities 1, 2, 3, 4, 5, 6, 7, 8, 9, 10, or more.

Referring to FIGS. 2, 5, 8A, 8B, and 8C, one novel embodiment of a bus bar 550 for use with the company switches 100 described herein is illustrated. The bus bar 550 illustrated is basically a rectangular piece of conductive material bent into an "L" shape. There is a first hole 552 at one end for passing a connecting pole 535 of a back connector 530. A second hole 554 is provided on the other end of the bus bar 550 for connecting the bus bar 550 to the front connector 540 to provide structural support and electrical connection to the front connector 540. The bus bar 550 can be made of any conducting material including but not limited to metal or semi-conducting material such as conductive plastic.

Certain embodiments of the invention utilize a material that is electrically conductive and provides rigid structural strength, such as copper, aluminum or other such materials. The bus bar 550 can be fashioned from one or more pieces of material, and can be shaped using processes including but not limited to milling, machining, spinning, drilling, stamping, sawing, cutting, bending, casting, or forging. The bus bar 550 of some embodiments is treated with a nonconductive insulator over areas where conductivity is not required. The holes 552, 554 and penetrations through the bus bar 550 can optionally be threaded to reduce the need for nuts. In some embodiments the bus bar 550 is integral with either or both of the front and back connectors 540, 530 such that each pole can be removed and replaced as an entire unit. The shape of the bus bar 550 illustrated near the front connector connection hole 554 is flat and wide and has an appropriate length to position the front connector 540 properly in the support block connector grooves 720. This shape provides additional support to prevent the front connectors 540 from rotating around the axis of either the attachment hole 545 or the lead hole 542. The company switch 100 can contain a quantity of one or more bus bars 550 fitting this description, including but not limited to the quantities 1, 2, 3, 4, 5, 6, 7, 8, 9, 10, or more.

Referring to FIGS. 2 and 5, certain embodiments connect the front connectors 540 to the back connectors 530 using a specially shaped or commonly available bus bar 550. The bus bar 550, as described above, provides electrical connection between the conducting portions of the front and back connectors 540, 530 and can also provide physical, structural support for the front connector 540 without requiring fasteners or other attachment mechanisms between or through the front connectors 540 and the support block 700. The bus bar 550 further provides a mechanism for mutual electrical connection among and between the connectors 530, itself, and a connection wire, cable, or terminated cable (not separately shown) through which an electrical circuit is established. The connection point between the bus bar 550 and either of the connectors 530, 540 provides a convenient point for connecting electrical leads from the breaker 220 or other non-switched leads. Such leads can be any conductor including wires, cables, flat cables, flexible bars, bus bars, any other conductor or any combinations thereof.

The bus bar 550 enables each of the front connectors 540 to be located immediately in front of and proximate to the electrically-corresponding back connector 530. This arrangement eliminates misidentification of the polarity of a specific front connector 540, and results in a substantial size reduction. Furthermore, the characteristic shape of the embodiment of the bus bar 550 illustrated in FIG. 5 positions the cable exiting the front connector 540 along an axis parallel to cables that exit the back connectors 530. Again, this arrangement yields space savings and the possibility of making both types connections simultaneously. As stated above either or both the back connectors 530 and front connectors 540 can be integral with the bus bar 550 and the bus bar and connectors 530, 540 can be produced as one part manufactured during a process. The bus bar 550 of such embodiments can include any combination of commonly available termination styles that are formed on either end of the bus bar 550. In certain embodiments, the back connectors 530 are compatible with a popular prefabricated connector type while the front connectors 540 are replaceable bare lead terminals that can be replaced as the threads for the actuating screws begin to wear out over the life of the company switch 100. In other embodiments, where the bus bar 550 includes one or both of the back connectors 530 and front connectors 540, bus bar is easily replaceable in the event that either connector 530, 540 is damaged.

Figure 9B:
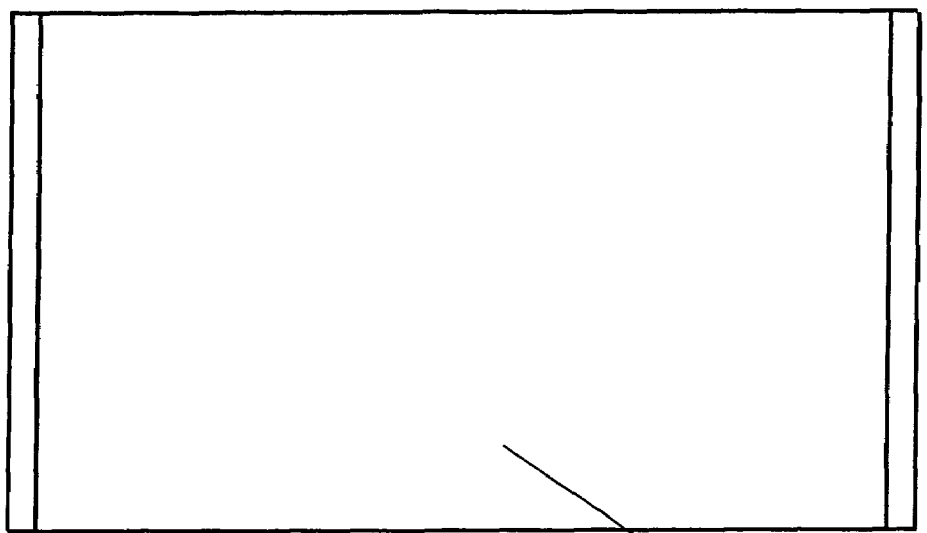
FIG. 9B is a front elevation view of a breaker mounting bracket of the embodiment of a company switch illustrated in FIG. 2.
Figure 9A:
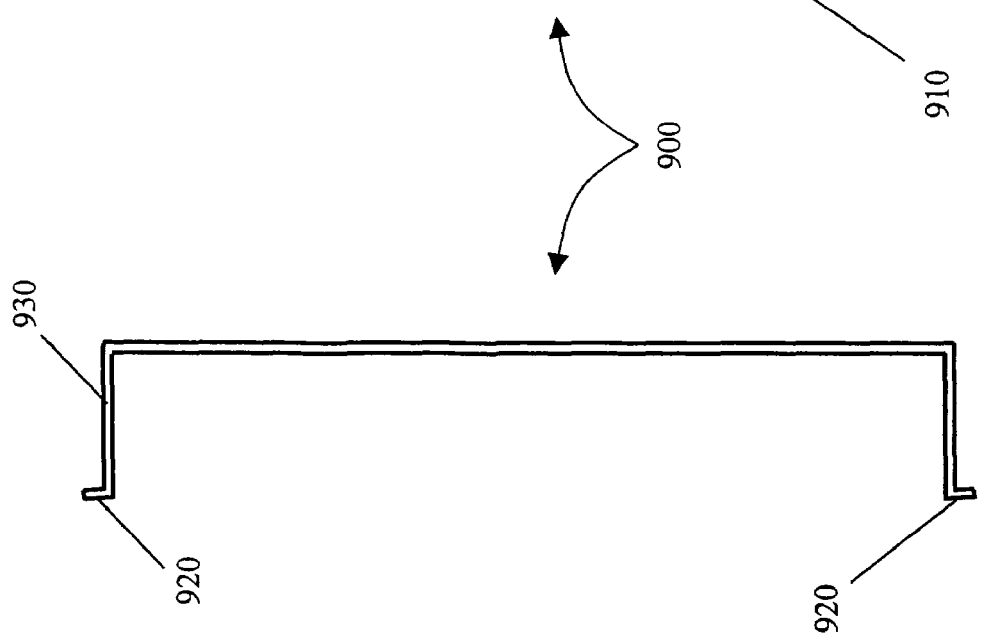
FIG. 9A is a side elevation view of a breaker mounting bracket of the embodiment of a company switch illustrated in FIG. 2.

FIGS. 9A and 9B illustrate an embodiment of a breaker mounting bracket 900. Referring to the embodiment illustrated in FIGS. 2, 9A and 9B, the breaker mounting bracket 900 consists of a generally rectangular mounting portion 910, two fixing portions 920 and two extension portions 930. The mounting portion 910 illustrated is a rectangular face that is adapted with the holes or slots (not shown) that are used to mount one or more particular breakers to be used with the company switch 100. For embodiments where the breaker is mounted by bonding or adhesion to the bracket, no holes or slots are required. The size and shape of the mounting portion are largely dependent on the mounting requirements of the breaker chosen, and in some embodiments, the size is only as large as necessary to cooperate with the mounts for the breaker selected.

The mounting portion 910 is supported on two sides by two extension portions 930. The two extension portions 930 are generally rectangular plates that attach at one end to a side of the mounting portion and are used to space the breaker away from the back of the company switch 100. The ends of the extension portions 930 opposite the ends attached to the mounting portion 910 are each attached to a fixing portion 920. The fixing portions 920 are elongated rectangular plates that for the surface though which fasteners pass or that is bonded or adhered to the back of the body 210 of the company switch 100, of FIG. 2. The fixing portions each have one of their sides attached to one corresponding side of an extension portion 930 to provide support for the extension portions.

Referring to FIGS. 2, 9A and 9B, The breaker mounting bracket 900 provides a convenient structure for supporting the breaker 220 and for properly positioning the breaker 220 in the body 210 of the company switch 100 such that the breaker 220 can be easily operated by a user when the front panel 110 is attached. The embodiment illustrated includes a mounting portion 910, two fixing portions 920 and two extension portions 930. The shape and characteristics of the mounting portion 910 is dependent upon the particular breaker 220 utilized. The mounting portion 910 preferably conforms to the shape of the breaker 220 and the mounting mechanism of the breaker 220. Any type of mounting mechanism can be included into the design of the mounting portion 910 including for instance, holes for fasteners.

The fixing portions 920 are flat areas that contact the body 210 to allow for attaching the breaker mounting bracket 900 onto the body 210. The breaker mounting bracket 900 can be attached using fasteners through holes in the body 210 and corresponding holes in the fixing portions 920 or by bonding such as welding or adhesion. Alternatively, in some embodiments the breaker mounting bracket 900 can be integral with the body 210. The width of the extension portions 930 provides the proper positioning of the breaker 220 within the body 210. The extension portions 930 are designed to position the operating handle (not separately shown) of the breaker 220 at the location of the breaker access window 180 so that a user does not have to reach too far into the company switch 100 and so the handle does not extend too far out of the front panel 110. The breaker mounting bracket 900 can be made of any material sufficient to provide the structural support necessary to mount the breaker 220 of a particular application. These materials can include plastic, wood, metal, composites, paper or paper products, or any combination thereof. In some embodiments, the breaker support bracket 900 is made of one piece of material by forming four parallel bends to form the shape illustrated in FIG. 9A.

Figure 10B:
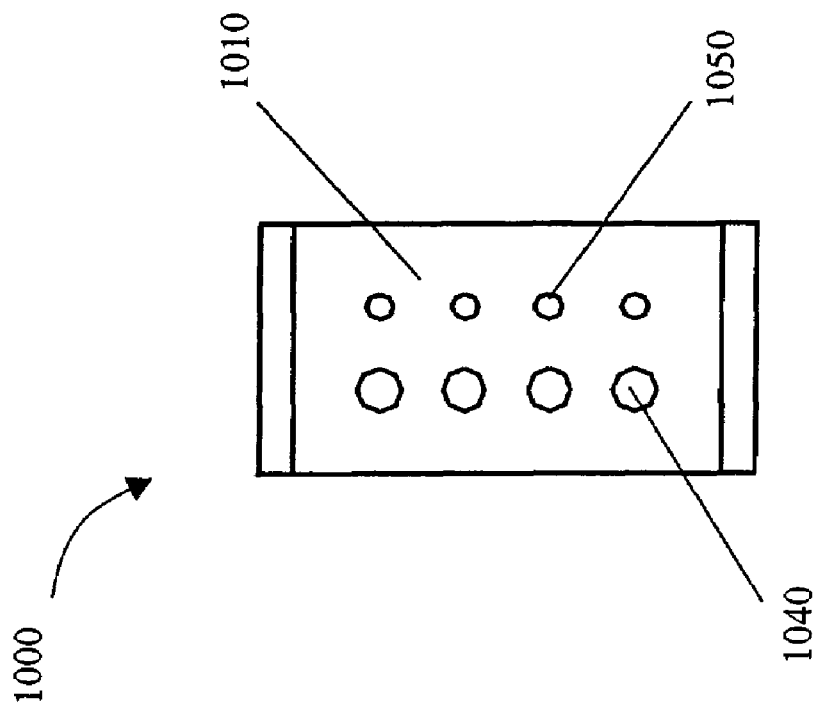
FIG. 10B is a front elevation view of a fuse and indicator light mounting bracket of the embodiment of a company switch illustrated in FIG. 2.
Figure 10A:
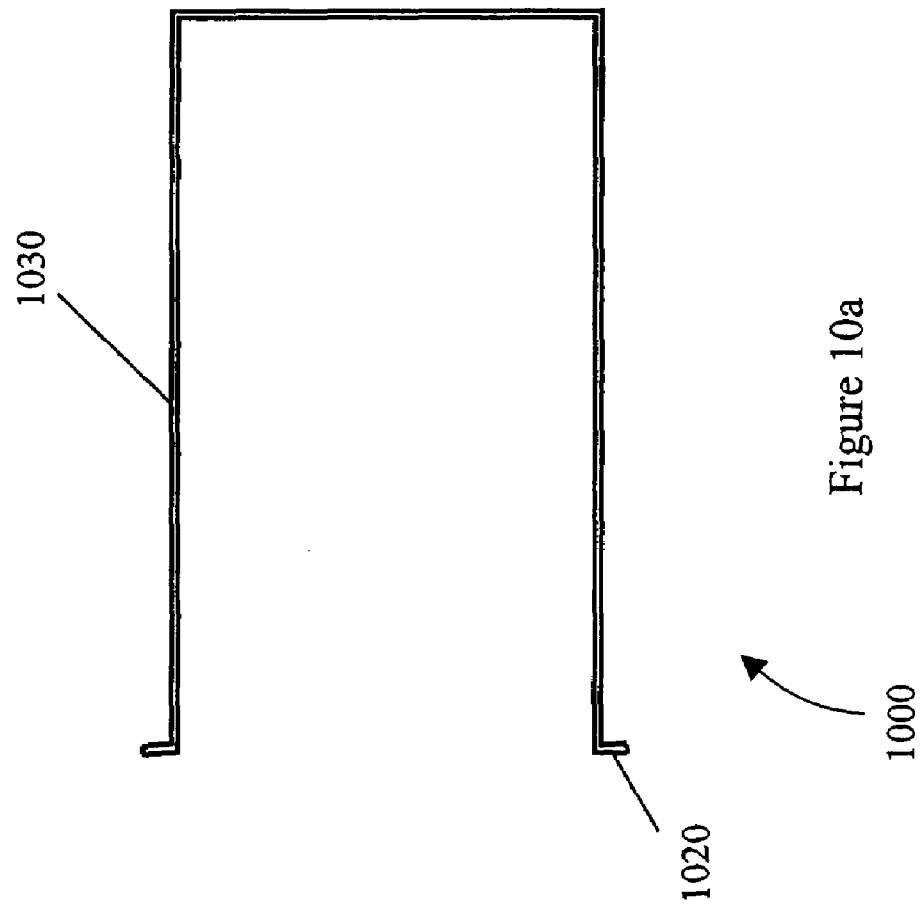
FIG. 10A is a side elevation view of a fuse and indicator light mounting bracket of the embodiment of a company switch illustrated in FIG. 2.

FIGS. 10A and 10B illustrate an embodiment of fuse and indicator light mounting bracket 1000. Referring to FIGS. 2, 10A and 10B, the fuse and indicator light mounting bracket 1000 provides a structure for supporting and positioning the indicator panel 240 in the body 210 of the company switch 100. The fuse and indicator light mounting bracket 1000 illustrated includes a mounting portion 1010, fixing portions 1020 and tow extension portions 1030. These components are analogous to the similarly named components described above for mounting the breaker 220 and therefore the above descriptions apply herein as well. The fuse and indicator light mounting bracket 1000 can also include a set of holes 1040, 1050 for back mounting either or both of the fuses of the indicator lights.

Therefore, various embodiments of a company switch are described herein that represent significant advances in the field of temporary power distribution. These advances have lead to increased safety and decreased size. In some of embodiments described herein, two termination types are illustrated but more or less can be used. Also, while lug and cam-type connections are illustrated, any type of connection can be used in the company switch. Furthermore, any material can be used to manufacture the various components and those of skill in the art will recognize that electrical insulation and material strength are desired properties for some components such as the terminal support base, while conductivity may be desired for the terminals and other components and such design choices are common for those of skill in the art and may be used for the embodiments illustrated herein.

In some embodiments, as described an interlock exists between the connection access panel/door and the main breaker of the company switch such that the main breaker will open if the access panel/door is opened. This interlock may be any switch or connection or other device capable of sensing the position of the access panel/door and controlling the main breaker. In one embodiment, the door has a magnetic closure and forms an electrical circuit with a breaker controller such that when the door is opened the circuit is broken and the main breaker trips open. However, any similar device can be used for this function.

In many embodiments the terminations all face in the same direction such that all the terminal leads are parallel when connected. The figures described above illustrate all of the connections facing downward but they can also be directed out the top or the sides of the enclosure as well. This reduces the space taken up by the connected company switch. Also, several embodiments have the bottom of the enclosure located a sufficient distance from the bottom of the terminations such that it would be extremely difficult to touch a live termination with any part of the body or even with many objects. Some embodiments have covers over the openings in the bottom that are not being used to enhance this feature. Some embodiments also have lockable handles for the access panels that further limit the access to the connections. Any type of handle or lock may be employed, and a lockable T-handle is just one example.

In many embodiments, the terminations include two types of termination styles, such as lug-type, or cam-type or any other termination design. Some embodiments will utilize more than two types of connector types for each parallel lead, thereby increasing the variety of leads accepted by the company switch. Many embodiments will utilize replaceable connections such that a terminal or connector can be easily replaced should it become damaged, worn or fouled. In some embodiments, the connectors/terminals are electrically and mechanically connected directly to one another, while in other embodiments a bus bar connects them and/or supports them. The bus bar can be connected to the terminations by any means capable of assisting contact of the bus bar with one or both of the connector. This can include welding, fastening, press fitting or any other manner.

Through one or more of these design advances, certain embodiments allow multiple connection types to be enclosed within an access chamber having a door interlocked with the main breaker, thereby improving the safety of the device. Furthermore, through certain advances described herein, leads from the device extend downward out of the enclosure flush to the mounting surface and result in a lower overall profile. Also, substantially tamper-proof connections are now available due to the protection of the lower enclosure surface and associated holes. Also, through many of these advances, the size of the company switch has greatly been reduced.

Some embodiments have various numbers of distribution lines associated with them, such as 2, 3, 4, 5, 6, 7, 8, 9, 10, 11, 12 or more that can all be supplied by one main breaker or several breakers or groups of breakers. In some embodiments, each distribution line is connected to more than one type of lead termination such that the distribution line can accept more than one type of leads separately or simultaneously. In another embodiment, each distribution line has both lead terminal lugs for connecting bare wire leads and cam-type connector for accepting cam-type leads such that a connection to the distribution line can be made with either or both types of leads.

In one particular embodiment, cam-type connectors and lug connectors associated with each distribution lead from the main line are mounted adjacent to one another such that the leads they connect both extend out of the bottom of the enclosure. Such embodiments have the connections located adjacent and connected to one another to reduce the size of the enclosure and to allow enclosure of both sets of terminations. In these embodiments, the enclosure extends 3, 4, 5, 6, 7, 8, 9, 10, 11, 12, 13, 14, 16, or 18 inches or more from the bottom of the connectors, thereby minimizing risk of contacting an energized connector. In these embodiments, the leads also extend through holes in the bottom of the enclosure and can be protected by guides made of protective material such as plastic, rubber, or any other material capable of protecting the shielding of the leads.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A housing comprising:
   a switch;
   a plurality of first terminations of a first connector type disposed within the housing and being electrically connected to the switch; and
   a plurality of second terminations of a second connector type disposed within the housing, each of the plurality of second terminations being electrically connected in parallel to one of the first terminations such that the housing is adapted to accept output leads of the first and second connector types, wherein at least one of the first plurality of terminations is oriented with respect to at least one of the second plurality of terminations such that the output leads connected to the at least one of the first plurality of terminations and to the at least one of the second plurality of terminations enter the housing from generally the same direction.

2. A housing according to claim 1 further comprising an access door to at least one of the plurality of first terminations or the plurality of second terminations.

3. A housing according to claim 2, wherein the access door is interlocked with the switch.

4. A housing according to claim 3, wherein opening the access door prevents the switch from conducting electricity to at least one of the plurality of first terminations or one of the plurality of second terminations.

5. A housing according to claim 1, wherein the switch is adapted to control flow of electrical power out of the housing.

6. A housing according to claim 1 further comprising an internal chamber, the plurality of first electrical terminations and the plurality of second electrical terminations being disposed in the chamber.

7. A housing according to claim 1, wherein the first connector type is a bare wire connector.

8. A housing according to claim 1, wherein the first connector type is a lug type connector.

9. A housing according to claim 1, wherein the first connector type forms a compression connection.

10. A housing according to claim 1, wherein the second connector type is a prefabricated termination.

11. A housing according to claim 1, wherein the second connector type is a cam-type termination.

12. A housing according to claim 1, wherein the plurality of first electrical terminations and the plurality of second electrical terminations each comprise 6 terminations.

13. A housing according to claim 1, wherein an end of at least one of the output leads comprises a connector, the housing being sized to receive the entire connector.

14. A housing according to claim 1, wherein the housing comprises at least one opening for receiving at least one of the output leads.

15. A housing according to claim 14, wherein the at least one opening has a discontinuous perimeter.

16. A housing according to claim 14, wherein the at least one opening has a continuous perimeter.

17. A housing according to claim 14, wherein the at least one opening is a hole.

18. A housing according to claim 14, wherein the at least one opening is a slot.

19. A housing comprising:
   at least one first termination of a first connector type disposed within the housing and being configured to accept a first output lead passing through the housing in a first direction;
   at least one second termination of a second connector type disposed within the housing and being configured to accept a second output lead passing through the housing in a second direction, the first direction being generally parallel to the second direction; and
   a switch electrically connected to the first and second terminations.

20. A housing according to claim 19 further comprising an access door to at least one of the first terminations or one of the second terminations.

21. A housing according to claim 20, wherein the access door is interlocked with the switch.

22. A housing according to claim 19, wherein the first and second terminations are disposed within the housing so that the first output lead and the second output lead are generally parallel to each other at least at a location inside the housing.

23. A housing according to claim 22, wherein the location is near the first and second terminations.

24. A housing according to claim 22, wherein the location is where the first and second output leads pass through the housing.

25. A housing according to claim 19 further comprising at least one opening for receiving at least one of the first and second output leads.

26. A housing according to claim 25, wherein the at least one opening has a discontinuous perimeter.

27. A housing according to claim 25, wherein the at least one opening has a continuous perimeter.

28. A housing according to claim 25, wherein the at least one opening is a hole.

29. A housing according to claim 25, wherein the at least one opening is a slot.

30. An electrical power distribution system comprising:
   an enclosure;
   a switch adapted to control electrical power between an electrical inlet terminal and an electrical outlet terminal;
   a first power supply termination of a first connector type disposed within the enclosure and being electrically connected to the electrical outlet terminal; and
   a second power supply termination of a second connector type disposed within the enclosure and being electrically connected in parallel with the first power supply termination, the second power termination being oriented with respect to at least one of the first power supply terminations such that ends of output leads connected to the first power supply termination and to the second power supply termination are generally parallel.

31. An electrical power distribution system according to claim 30, wherein the first connector type is a bare wire connection.

32. An electrical power distribution system according to claim 30, wherein the first connector type is a lug type connector.

33. An electrical power distribution system according to claim 30, wherein the first connector type forms a compression connection.

34. An electrical power distribution system according to claim 30, wherein the second connector type is a prefabricated termination.

35. An electrical power distribution system according to claim 30, wherein the second connector type is a cam-type termination.

36. A method of distributing electrical power, comprising:
providing a housing having a first plurality of terminations of a first connector type and a second plurality of terminations of a second connector type, both of the first and second pluralities of terminations being disposed within the housing and being electrically connected in parallel to a switch;
connecting at least one power supply line to the switch;
electrically connecting a first distribution lead to one of the first and second pluralities of terminations; and
electrically connecting a second distribution lead to the other one of the first and second pluralities of terminations such that the first and second distribution lead enter the housing in substantially parallel directions.

37. A power distribution device for use with at least one lead having a connector, comprising:
an enclosure having a lower wall;
a switch;
a connection chamber;
an access door to the connection chamber, the access door being movable between an open position and a closed position, the connection chamber being inaccessible to a hand of a user when the access door is in the closed position and accessible to the hand when the access door is in the open position;
a plurality of terminations disposed within the connection chamber and being electrically connected to the switch, each termination being spaced a distance from the lower wall so as to reduce the risk of a user contacting the plurality of terminations when the access door is in the closed position, the plurality of terminations being oriented with respect to the lower wall such that the at least one lead when connected to one of the plurality of terminations enters the enclosure through the lower wall; and
a plurality of openings in the lower wall, each opening being sized to receive the connector while being small enough to inhibit a hand of the user from entering the enclosure through the opening.

* * * * *